United States Patent [19]

Baumgartner et al.

[11] 4,012,163
[45] Mar. 15, 1977

[54] WIND DRIVEN POWER GENERATOR

[75] Inventors: Franklin W. Baumgartner, Denver; John Michael Murphy, Littleton, both of Colo.

[73] Assignee: Franklin W. Baumgartner, Denver, Colo. ; a part interest

[22] Filed: Sept. 8, 1975

[21] Appl. No.: 611,090

[52] U.S. Cl. .................................... 415/2; 98/72; 290/44; 290/55; 416/227 A
[51] Int. Cl.$^2$ ..................................... F03D 7/06
[58] Field of Search ............. 415/2, 4; 290/43, 44, 290/54, 55; 416/227; 98/69, 72

[56] References Cited

UNITED STATES PATENTS

| | | | |
|---|---|---|---|
| 1,471,095 | 10/1923 | Bonetto | 415/2 |
| 1,936,233 | 11/1933 | Groves | 290/44 |
| 2,013,244 | 9/1935 | LaVergne | 98/72 |
| 2,020,900 | 11/1935 | Methvin | 416/227 A |
| 2,373,207 | 4/1945 | Touhey | 290/55 |
| 2,517,135 | 8/1950 | Rudisill | 290/44 |
| 3,339,078 | 8/1967 | Crompton | 415/2 |
| 3,697,765 | 10/1972 | Carini | 290/44 |
| 3,721,290 | 3/1973 | Butler, Jr. | 290/55 |
| 3,793,530 | 2/1974 | Carter | 290/44 |
| 3,797,374 | 3/1974 | Jones | 98/72 |
| 3,883,750 | 5/1975 | Uzzell, Jr. | 290/44 |
| 3,944,840 | 3/1976 | Troll | 290/55 |

FOREIGN PATENTS OR APPLICATIONS

| | | | |
|---|---|---|---|
| 259,558 | 4/1927 | United Kingdom | 416/227 |

*Primary Examiner*—C. J. Husar

[57] ABSTRACT

A turbine type power generator includes a rotor having a vertical shaft to drive a load which may be an electric generator or mechanical gear train or other device for using or transmitting power. Generally vertically extending blades are secured at their ends to the rotor shaft and are set at an angle to the relative wind to be driven thereby. The rotor is surrounded by wind controlling shield means through which the air flow passes to contact the blades in the proper direction for causing rotation. The free flow air inlet area is substantially less than the maximum projected area of the shield means normal to the relative wind so that the total wind trapped must flow through a reduced area with a consequent increase in velocity to impart more energy to the rotor blades. One form of shield means is a structure of the same general shape as the rotor surrounding the rotor on all sides and having vertically extending passages spaced around its perimeter to lead the air flow to the blades. Another form of shield means is an elongate, horizontally extending tube with the rotor mounted therein at an intermediate position. The inlet opening of the tube is larger than the throat area and the trapped wind is increased in velocity before it contacts the rotor blades.

10 Claims, 9 Drawing Figures

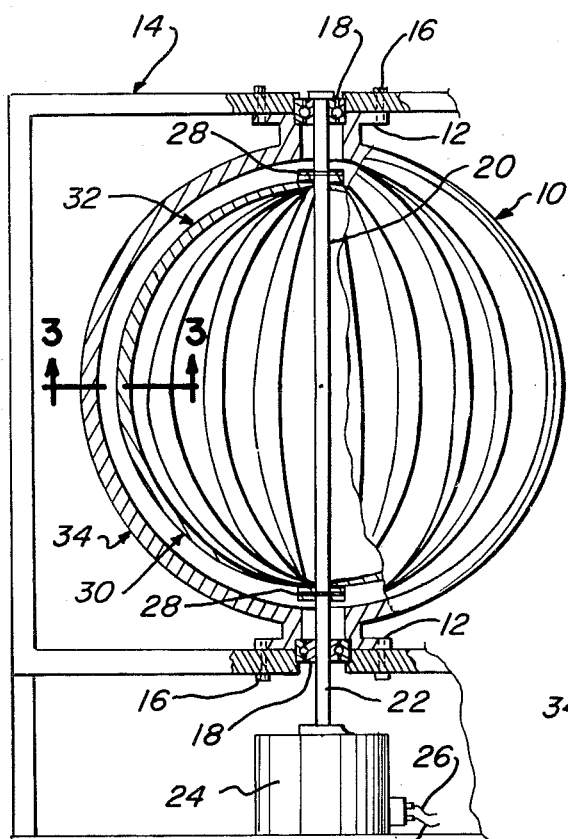
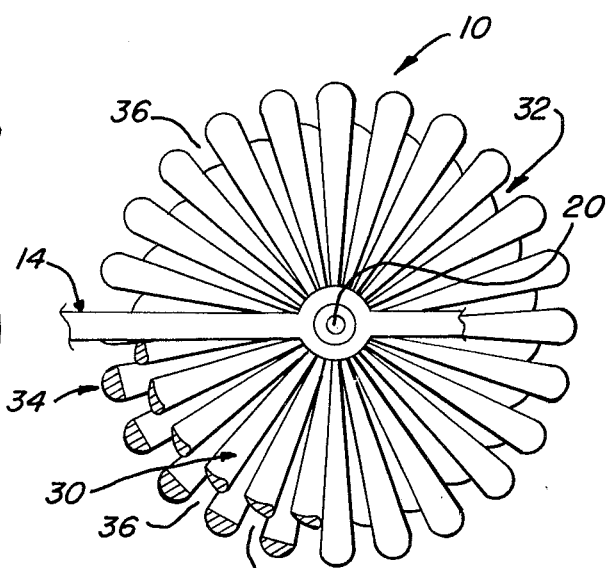
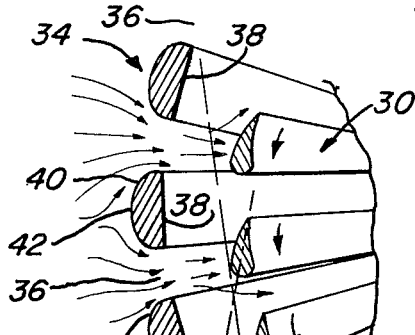
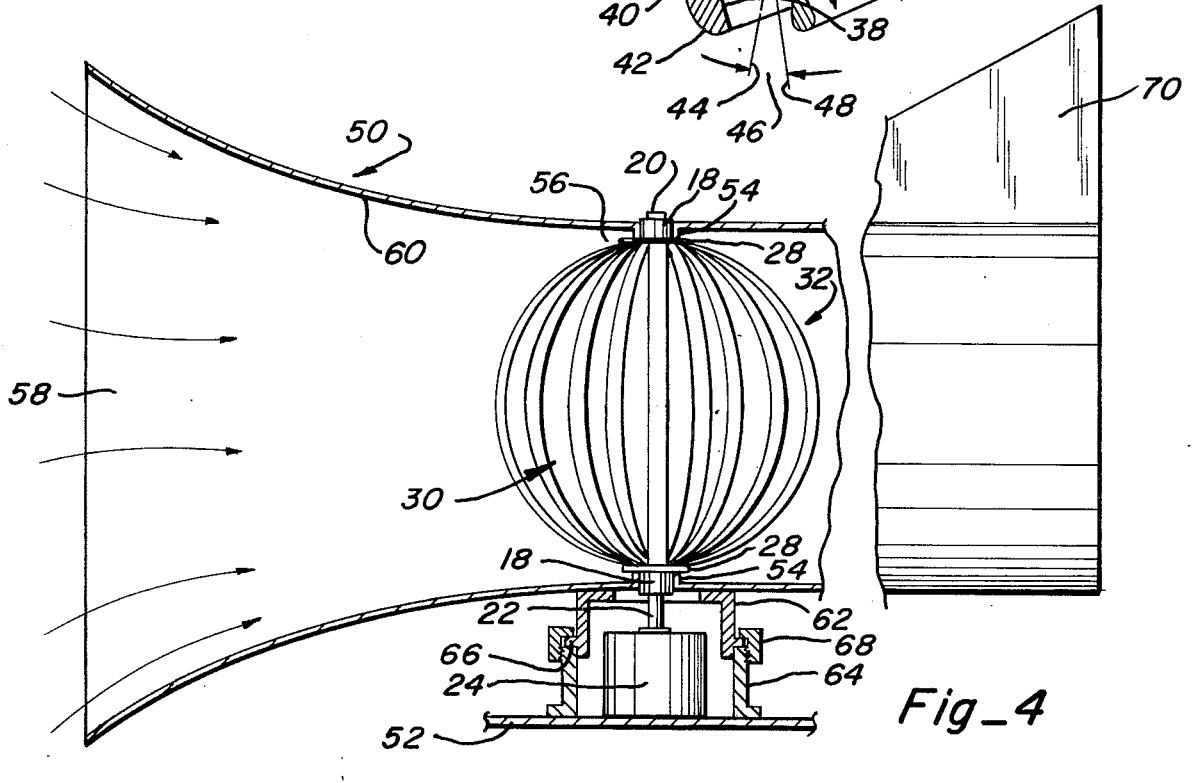
Fig_1
Fig_2
Fig_3
Fig_4

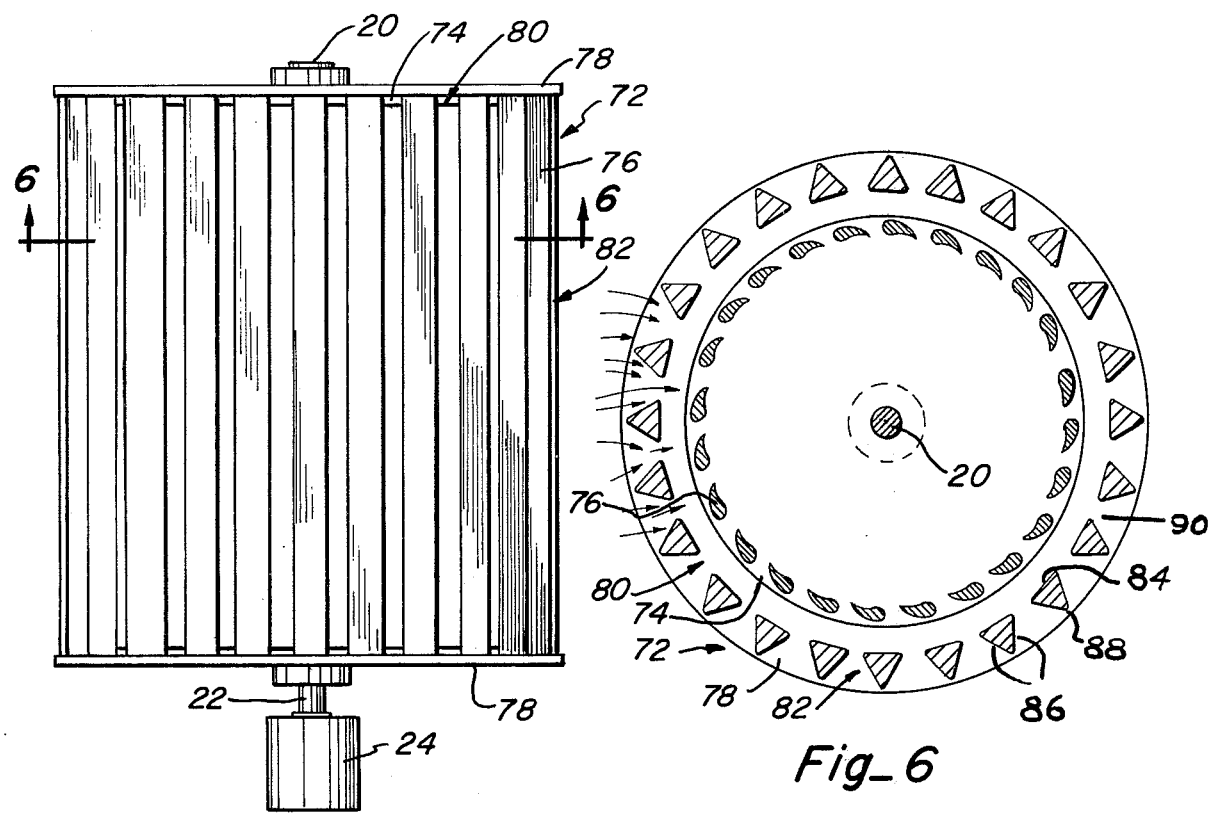
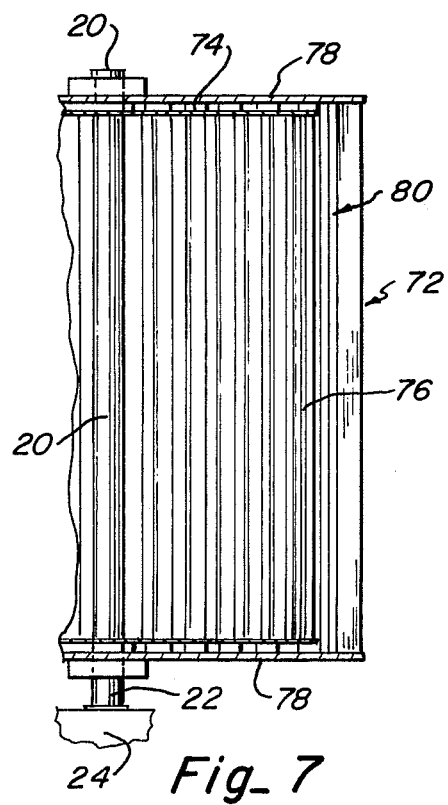
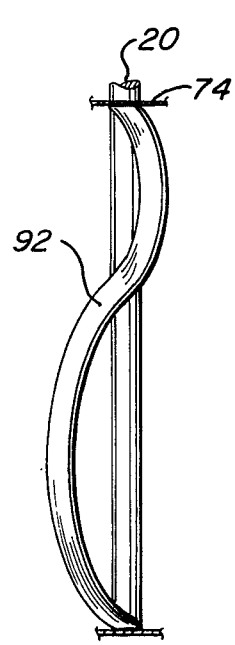
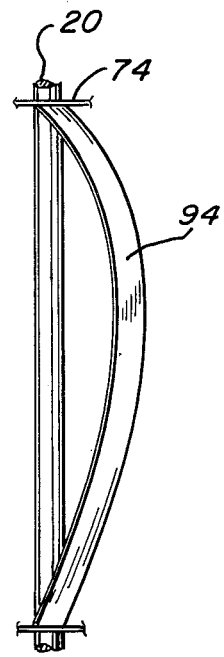
Fig_5  Fig_6  Fig_7  Fig_8  Fig_9

WIND DRIVEN POWER GENERATOR

BACKGROUND OF THE INVENTION

This invention lies in the field of power generators which take advantage of the force exerted by a relative wind to produce mechanical or electric power which may be used for various purposes. It is particularly directed to a rotor type device combined with shielding means to properly direct the air flow to the rotor for maximum effectiveness and to increase the velocity of the air flow well above the wind velocity in order to greatly increase the energy available to cause rotation of the rotor.

Many different wind driven devices have been proposed and used for taking energy from the wind and transforming it into mechanical or electric power. The best known is the typical farm windmill which is quite satisfactory for its normal intended use of driving a water pump since it can usually provide more water than is needed, even at low efficiency. Such windmills are large, cumbersome, and expensive in relation to the amount of useful work they produce. They have a multitude of very large blades which are directly driven by the relative wind which contacts them, the velocity of which is often so low that they cannot move the load.

Another common type is the generally spherical "turbine" type rotors used widely on houses to evacuate hot air from attics and garages. These rotors have multiple blades set at an angle to catch the relative wind at one side and deflect the wind at the other side. Again, they are quite suitable for their intended purpose but they are actuated by the wind at its normal velocity and produce so little power that they cannot drive any appreciable load.

Numerous other schemes have been tried with varying degrees of success and with various disadvantages. Many have been too inefficient or have produced too little power to have real utility. Others have been so complicated and expensive to build that they have not been economically feasible.

SUMMARY OF THE INVENTION

The apparatus of the present invention overcomes the disadvantages mentioned above and provides a simple and durable apparatus which needs only a minimum of maintenance and extracts a very high degree of available energy from the wind.

Generally stated, the power generator of the invention comprises a rotor which includes a rotor shaft mounted for rotation about an upright substantially vertical axis and a plurality of narrow elongate rotor blades secured to the shaft for rotation therewith, each rotor blade extending substantially vertically throughout at least the major portion of the axial length of the rotor and being located in a general radial plane including the axis of the rotor shaft, and a wind controlling shield means surrounding the rotor and acting to control the air flow into the rotor. The major portion of the length of each blade is well spaced from the rotor shaft and is connected at each end to the shaft. In addition, each blade is formed so that its chord is set at a predetermined angle to the tangent to its path of travel so that the air flow striking it will cause rotation of the shaft.

One preferred form of shield means is constructed to define a general surface of revolution corresponding to that defined by the rotor and sufficiently larger to allow running clearance for the rotor within the shield means which surrounds it on all sides. The shield means comprises a plurality of narrow elongate upright shield elements each being located in a general upright radial plane including the axis of the rotor shaft, and the elements are peripherally spaced to define between them a plurality of narrow upright free flow inlet air passages adjacent to the rotor blades. The peripheral width and spacing of the elements are such that the total area of the passages exposed to the prevailing relative wind from any compass direction is substantially less than the projected area of the shield means in a plane normal to the direction of the prevailing relative wind. Since the area of the air mass confronting the shield must be reduced to the area of the available passages, its velocity is correspondingly increased. The formula for determining the power produced by the apparatus from the energy of a mass of air per unit time passing through the flow area is stated as:

$P = \frac{1}{2} m V^2$ where

P = power m = mass of air per unit time and

V = velocity

Thus it can be seen that power varies with the square of the velocity, and an area ratio of 2 to 1 will produce a velocity ratio of 1 to 4.

Another preferred form of shield means comprises an elongate tube mounted in a horizontal attitude. The rotor is mounted at an intermediate point within the tube to rotate about a vertical axis, and the throat of the tube at that point has a cross sectional area sufficiently larger than the cross sectional area of the rotor to provide running clearance for the rotor. The inlet end of the tube is substantially larger than the throat in the manner of a venturi to produce the desired increase in the velocity of the air flow contacting the rotor blades.

BRIEF DESCRIPTION OF THE DRAWINGS

Various other advantages and features of novelty will become apparent as the description proceeds in conjunction with the accompanying drawings, in which:

FIG. 1 is an elevational view, partly in section, of one form of the apparatus;

FIG. 2 is a top plan view, partly in section, of the apparatus of FIG. 1;

FIG. 3 is a sectional view taken on line 3—3 of FIG. 1;

FIG. 4 is a side elevational view, partly in section, of a modified form of the apparatus;

FIG. 5 is an elevational view of a further modified form of the apparatus;

FIG. 6 is a sectional view taken on line 6—6 of FIG. 5;

FIG. 7 is an elevational view, partly in section, of some of the details of FIG. 5;

FIG. 8 is an elevational view, looking in the direction of line 8—8 of FIG. 7, showing a modified form of rotor blade; and FIG. 9 is a view similar to FIG. 8, showing a further modified form of rotor blade.

DESCRIPTION OF PREFERRED EMBODIMENTS

A first preferred form of power generator incorporating the features of the invention is diagrammatically illustrated in FIGS. 1 to 3, in which shield member 10 is provided with flanges 12 secured to frame 14 by bolts 16. Bearings 18 carried by the upper and lower flanges serve to mount rotor shaft 20 for rotation about a vertical axis. Shaft 20 is provided with an extension 22 which is in power transmitting relation to unit 24, which may be a gear box or other mechanical drive device but is here shown as an electric generator having conductors 26 leading to any desired device for utilizing electrical energy. Shaft 20 is provided with vertically spaced flanges 28 fixed thereto, and rotor blades 30 are connected at their upper and lower ends to the flanges to complete the rotor 32.

Each rotor blade 30 extends substantially vertically throughout at least the major portion of the axial length of the rotor and is located in a general radial plane including the axis of the rotor shaft. Each blade has an arcuate form in a radial plane including the axis of the rotor shaft, and the blade and flange assembly generally defines a spherical surface of revolution.

The shield means 10 comprises a plurality of narrow elongate upright shield elements 34 each located in a general upright radial plane including the axis of the rotor shaft and each having an arcuate form in the radial plane, the upper and lower ends of the elements being connected to flanges 12 to define a spherical surface of revolution conforming to that of the rotor and sufficiently larger to provide running clearance for the rotor.

Elements 34 and rotor blades 30 are similarly spaced around the periphery of the shield means and the rotor, but the number of blades need not be the same as the number of shield elements. The construction and relation of these members is indicated in greater detail in FIGS. 2 and 3. Elements 34 are spaced peripherally to define a plurality of free flow air inlet passages 36 which extend upright between the elements 34 and provide for the flow of relative wind into driving contact with rotor blades 30. Since the total cross sectional area of the inlet passages exposed to the prevailing relative wind at any time is substantially less than the projected cross sectional area of the shield means in a plane normal to the direction of the relative wind, the velocity of the air mass will be substantially increased as it enters the passages to transmit increased power to the rotor blades.

The cross sections of several peripherally adjacent shield elements are shown in enlarged detail in FIG. 3 to indicate how they cooperate to divide the relative wind into air flow segments smoothly and efficiently directed into the several inlet passages. Each element cross section has a flat base 38 at its inner side and an arcuate contour 40 connected thereto and tapering to a peak 42 at the outer surface of the shield means so that each two peripherally adjacent elements define an inwardly tapering inlet air passage 36 to gradually reduce the flow area and increase the air velocity. The air travels substantially radially inward to contact rotor blades 30, which are so shaped that the chord 44 of each blade is set at an angle of incidence 46 to the tangent 48 to the periphery of the path of travel of the blade. Therefore, the air flow strikes the blade at a complementary angle, and the peripheral component of the air flow force drives the blade for rotation.

A modified form of the apparatus is shown in FIG. 4. The generally spherical shield means is replaced by one in the form of an elongate tube 50 mounted in a horizontal attitude on base 52. Vertically spaced bearings 18 are carried by flanges 54 integral with the wall of tube 50 and located in the throat 56 of the tube at the intermediate point shown. Rotor 32 is the same as the rotor of FIGS. 1 to 3 and its rotor shaft 20 is mounted in bearings 18 for rotation about a vertical axis as before. The extension 22 of shaft 20 drives the load 24 in the same manner as in the first form. The cross section of the tube at the throat 56 is circular to correspond to that of the rotor and is sufficiently larger to provide running clearance for the rotor.

Inlet opening 58 at the forward end of tube 50 has a substantially larger cross sectional area than that of the throat 56 and the inner wall 60 tapers inwardly and rearwardly from the inlet opening to the throat to gradually reduce the flow area and increase the velocity of the air flow which acts on blades 30 of rotor 32 in the same manner as in the previous form.

To mount the tube 50 on base 52, the tube is provided with a depending cylindrical pivot collar 62 which is rotatably mounted in cylindrical bearing 64 carried by the base. The collar has a flange 66 rotatably seated on the upper end of bearing 64, and a flanged retainer cap 68 is threadedly secured to bearing 64 to prevent disengagement of the tube. Directional vane 70 is mounted on tube 50 aft of throat 56 to cause the inlet opening 58 to face into the prevailing relative wind. If the apparatus is mounted on a mobile vehicle to provide auxiliary power for use on the vehicle, the tube is set with the inlet opening facing in the direction of travel, and retainer cap 68 is screwed down tightly on bearing 64 to prevent change of attitude of the tube.

Another preferred form of the apparatus is shown in FIGS. 5 to 7. The rotor 80 and shield means 72 are constructed in basically the same way as those of FIGS. 1 to 3. However, in this form, flanges 74 secured to rotor shaft 20 are enlarged to the full diameter of the rotor, and rotor blades 76 are straight and vertical and fastened to the flanges at their perimeters. Thus the surface of revolution of the rotor is cylindrical rather than spherical, and the full length of each blade is well spaced from the rotor shaft to receive a maximum amount of energy from the air flow. The blades have the same cross sectional shape and angle of incidence as blades 30.

The shield means 72 similarly is provided with enlarged flanges 78 and with shield elements 82 which are straight and vertical and secured to the peripheries of flanges 78 to define a cylindrical surface of revolution, the shield means being sufficiently larger than the rotor to provide running clearance.

The modified cross sectional form of shield elements 82 comprises a substantially flat inner base 84 and a pair of flat sides 86 tapering to a point 88 at the outer surface of the shield means to define inwardly tapering inlet air passages 90 to contract the air flow and increase its velocity.

FIGS. 8 and 9 are elevational views of modified forms of rotor blades 92 and 94 looking radially inwardly toward the rotor shaft. These sinusoidal and arcuate forms are suitable for use in certain special installations.

A particular merit of the forms of FIG. 1 to 3 and 5 to 7 is that the shield means may be fixedly mounted and yet control and direct the air flow of the relative wind to arcuate the rotor in the same way and to the same extent regardless of the instantaneous direction of the wind.

Shield elements of the cross sectional form of elements 82 may be used in the apparatus of FIGS. 1 to 3, and shield elements of the cross sectional form of elements 34 may be used in the apparatus of FIGS. 5 to 7 if desired. Also, the rotor 80 of FIGS. 5 to 7 may be used in apparatus of the type of FIG. 4. In this case, the tube 50 would have a rectangular cross section similar to the projected cross section of the rotor.

Changes and modifications can be made within the scope of the claims, as for example, the shield or stator means 10 may itself be the support means thus not requiring a frame 14.

What is claimed is:

1. A wind driven power generator comprising:
a rotor including a rotor shaft mounted for rotation about an upright axis and a plurality of narrow elongate rotor blades secured to the shaft for rotation therewith;
each rotor blade extending throughout a substantial portion of the axial length of the rotor in a general radial plane including the axis of the rotor shaft and cooperating with the other blades to define a surface of revolution;
each blade having a cross sectional shape configured and arranged to present an outer surface, at least the major portion of which extends rearwardly and inwardly with respect to the surface of the rotor to be rotationally driven by contact of air flowing inwardly toward the center of the rotor;
wind controlling shield means surrounding the rotor and conformed to define a free flow air inlet area adjacent to the rotor blades which is substantially less than the maximum projected area of the shield means in a plane normal to the direction of the relative wind and serving to increase the velocity of the air flow contacting the rotor blades well above the velocity of the relative wind;
the shield means being operative to cause the high velocity air flow to travel in a direction generally perpendicular to the axis of the rotor shaft;
a power transmitting axial extension of the rotor shaft extending outward of the shield means;
and power absorbing load means connected to the extension;
the shield means being in the general form of a surface of revolution conforming to the surface of revolution defined by the rotor and being sufficiently larger to provide running clearance for the rotor;
the shield means comprising a plurality of narrow elongate upright shield elements, each lying in a general upright radial plane including the axis of the rotor shaft and peripherally spaced to define between them a plurality of narrow upright free flow inlet air passages adjacent to the rotor blades;
the total area of the passages exposed to the prevailing relative wind being substantially less than the projected area of the shield means in a plane normal to the direction of the prevailing relative wind.

2. A power generator as claimed in claim 1; in which each blade is spaced from the rotor shaft throughout at least the major portion of the length of the blade, and its ends are connected to the rotor shaft.

3. A power generator as claimed in claim 2; in which first and second flanges are fixed to axially spaced portions of the rotor shaft and first and second ends of the rotor blades are secured to the respective flanges to drive the rotor shaft in response to peripheral movement of the blades.

4. A power generator as claimed in claim 3; in which each blade has an arcuate form in a radial plane including the axis of the rotor shaft;
and the blade and flange assembly generally defines a spherical surface of revolution.

5. A power generator as claimed in claim 3; in which each blade extends generally parallel to the rotor shaft in radially spaced relation thereto;
and the blade and flange assembly generally defines a cylindrical surface of revolution.

6. A power generator as claimed in claim 1; in which the shield means is fixedly connected to a support and controls the air inflow from a relative wind approaching from any compass point.

7. A power generator as claimed in claim 1; in which each shield element has a cross section which is substantially wider at the inner side of the element than at the outer side;
each two peripherally adjacent elements cooperating to define an inwardly tapering inlet air passage operative to increase the velocity of the air flow contacting the rotor blades.

8. A power generator as claimed in claim 7; in which the cross section of each shield element comprises a substantially flat inner base and an arcuate contour connected thereto tapering to a peak at the outer surface of the shield means.

9. A power generator as claimed in claim 7; in which the cross section of each shield element comprises a substantially flat inner base and a pair of flat sides connected thereto tapering to a point at the outer surface of the shield means.

10. A power generator as claimed in claim 1; in which vertically spaced bearings are connected to the shield means, and the rotor shaft is mounted in the bearings.

* * * * *